US012748126B2

(12) United States Patent
Lebedev et al.

(10) Patent No.: US 12,748,126 B2
(45) Date of Patent: Sep. 29, 2026

(54) OPTICAL ACCELEROMETER SYSTEM

(71) Applicant: NORTHROP GRUMMAN SYSTEMS CORPORATION, Falls Church, VA (US)

(72) Inventors: Vyacheslav Lebedev, Redondo Beach, CA (US); Steven Ryan Jefferts, Chatsworth, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 238 days.

(21) Appl. No.: 18/590,519

(22) Filed: Feb. 28, 2024

(65) Prior Publication Data

US 2024/0295581 A1 Sep. 5, 2024

Related U.S. Application Data

(60) Provisional application No. 63/449,340, filed on Mar. 2, 2023.

(51) Int. Cl.

| | |
|---|---|
| ***G01P 15/093*** | (2006.01) |
| ***G01P 15/13*** | (2006.01) |
| ***G02B 26/00*** | (2006.01) |

(52) U.S. Cl.

CPC ............ *G01P 15/093* (2013.01); *G01P 15/13* (2013.01); *G02B 26/001* (2013.01)

(58) Field of Classification Search

CPC ...... G01P 15/093; G01P 15/13; G01P 15/131; G02B 26/001

(Continued)

(56) References Cited

U.S. PATENT DOCUMENTS

| | | |
|---|---|---|
| 3,789,674 A | 2/1974 | Anderson et al. |
| 4,048,859 A | 9/1977 | Babcock |

(Continued)

FOREIGN PATENT DOCUMENTS

| | | |
|---|---|---|
| CN | 114740223 A | 7/2022 |
| JP | 10104056 A | 4/1998 |

(Continued)

OTHER PUBLICATIONS

WOISR (International Search Report & Written Opinion) for corresponding PCT/US2024/017944, mailed Jul. 2, 2024.

(Continued)

*Primary Examiner* — Robert R Raevis

(74) *Attorney, Agent, or Firm* — Renner Otto Boisselle Sklar LLP; Christopher P. Harris

(57) ABSTRACT

One example includes an optical accelerometer system. The system includes an optical cavity system comprising a variable optical cavity that propagates a first optical beam and a fixed optical cavity that propagates a second optical beam. The fixed optical cavity can have a fixed cavity length and the variable optical cavity can have a cavity length that changes in response to an external acceleration. The optical cavity system can also include optics to provide a beat optical beam that is a combination of the first and second optical beams. The system also includes a detection system to monitor the beat optical beam to generate a beat voltage that is indicative of the frequency of the beat optical beam. The detection system can compare the beat voltage with a stable frequency reference voltage to determine a magnitude of the external acceleration.

20 Claims, 3 Drawing Sheets

(58) Field of Classification Search
USPC .................. 73/1.38, 514.18, 514.26, 514.27; 356/614, 615
See application file for complete search history.

(56) References Cited

U.S. PATENT DOCUMENTS

| | | | |
|---|---|---|---|
| 4,155,251 | A * | 5/1979 | Lautzenhiser .......... G01L 1/241 73/514.27 |
| 4,157,495 | A | 6/1979 | Grover et al. |
| 4,226,120 | A | 10/1980 | Nissl |
| 4,275,296 | A | 6/1981 | Adolfsson |
| 4,430,616 | A | 2/1984 | Grover |
| 4,699,451 | A | 10/1987 | Mohr |
| 4,793,708 | A | 12/1988 | Bednarz |
| 4,876,447 | A | 10/1989 | Killian |
| 4,900,918 | A | 2/1990 | Killian |
| 4,992,656 | A | 2/1991 | Clauser |
| 5,004,341 | A | 4/1991 | Grynberg et al. |
| 5,274,232 | A | 12/1993 | Chu et al. |
| 5,326,983 | A | 7/1994 | Hejazi |
| 5,394,233 | A | 2/1995 | Wang |
| 5,973,783 | A | 10/1999 | Goldner et al. |
| 6,009,111 | A | 12/1999 | Corwin et al. |
| 6,209,972 | B1 | 4/2001 | Matsuno |
| 6,303,928 | B1 | 10/2001 | Buell et al. |
| 6,421,421 | B1 | 7/2002 | McGeoch |
| 6,538,748 | B1 | 3/2003 | Tucker et al. |
| 6,635,867 | B2 | 10/2003 | Kajita |
| 6,744,038 | B2 | 6/2004 | Wang et al. |
| 6,763,718 | B1 | 7/2004 | Waters et al. |
| 7,139,446 | B2 | 11/2006 | Slotwinski |
| 7,222,534 | B2 | 5/2007 | Maas et al. |
| 7,355,720 | B1 | 4/2008 | Carr |
| 7,645,987 | B2 | 1/2010 | Chang et al. |
| 7,711,130 | B2 | 5/2010 | Husung |
| 7,751,042 | B2 | 7/2010 | Okuno |
| 7,808,618 | B1 | 10/2010 | Tawney et al. |
| 7,826,629 | B2 | 11/2010 | Miles et al. |
| 7,880,894 | B2 | 2/2011 | Hirata et al. |
| 7,965,148 | B2 | 6/2011 | Larsen |
| 8,072,609 | B1 | 12/2011 | Trivedi et al. |
| 8,201,452 | B2 | 6/2012 | Oldsen et al. |
| 8,205,497 | B1 | 6/2012 | Okandan et al. |
| 8,542,956 | B2 | 9/2013 | Akkaya et al. |
| 8,663,731 | B2 | 3/2014 | Wang et al. |
| 8,813,571 | B2 | 8/2014 | Iwamoto et al. |
| 8,941,053 | B1 | 1/2015 | Biedermann et al. |
| 9,086,429 | B1 | 7/2015 | Biedermann et al. |
| 9,285,390 | B2 | 3/2016 | Meyer et al. |
| 10,371,523 | B1 * | 8/2019 | Shahriar .............. G01C 19/661 |
| 2003/0081218 | A1 | 5/2003 | Orban |
| 2003/0132749 | A1 | 7/2003 | Speier et al. |
| 2003/0230664 | A1 | 12/2003 | Healy |
| 2004/0046111 | A1 | 3/2004 | Swierkowski |
| 2004/0149037 | A1 | 8/2004 | Digonnet et al. |
| 2004/0227032 | A1 | 11/2004 | Gregory |
| 2005/0052724 | A1 | 3/2005 | Suzuki et al. |
| 2006/0032471 | A1 | 2/2006 | Yalin et al. |
| 2006/0066875 | A1 | 3/2006 | Huber et al. |
| 2006/0181712 | A1 | 8/2006 | Degertekin et al. |
| 2007/0236704 | A1 | 10/2007 | Carr |
| 2007/0261489 | A1 | 11/2007 | Murelitharan |
| 2007/0266784 | A1 | 11/2007 | Lust et al. |
| 2008/0046214 | A1 | 2/2008 | Fowler |
| 2008/0163686 | A1 | 7/2008 | Carr |
| 2008/0225274 | A1 | 9/2008 | Hirata et al. |
| 2008/0278710 | A1 | 11/2008 | Schmidt et al. |
| 2008/0291457 | A1 | 11/2008 | Carr |
| 2008/0296483 | A1 | 12/2008 | McClelland et al. |
| 2009/0122318 | A1 | 5/2009 | Kopacz et al. |
| 2009/0122319 | A1 | 5/2009 | Ronnekleiv et al. |
| 2009/0154308 | A1 | 6/2009 | Kato |
| 2009/0214157 | A1 | 8/2009 | Okubo et al. |
| 2009/0268211 | A1 | 10/2009 | Carr et al. |
| 2009/0309668 | A1 | 12/2009 | Bulatowicz et al. |
| 2010/0007345 | A1 | 1/2010 | Kanegsberg |
| 2010/0046002 | A1 | 2/2010 | Perez et al. |
| 2011/0292321 | A1 | 12/2011 | Travis et al. |
| 2011/0303008 | A1 | 12/2011 | Zhang et al. |
| 2011/0311186 | A1 | 12/2011 | Adams |
| 2012/0116709 | A1 | 5/2012 | Martin et al. |
| 2012/0143018 | A1 | 6/2012 | Skidmore et al. |
| 2013/0104655 | A1 | 5/2013 | Andresen et al. |
| 2013/0230329 | A1 | 9/2013 | Sangawa et al. |
| 2013/0327146 | A1 | 12/2013 | Meyer et al. |
| 2014/0054451 | A1 | 2/2014 | Abedin et al. |
| 2014/0070082 | A1 | 3/2014 | Guo et al. |
| 2014/0374581 | A1 | 12/2014 | Dionne et al. |
| 2015/0015251 | A1 | 1/2015 | Bulatowicz |
| 2015/0204899 | A1 | 7/2015 | Salit et al. |
| 2015/0316625 | A1 | 11/2015 | Bulatowicz |
| 2016/0033675 | A1 | 2/2016 | Csutak |
| 2020/0018823 | A1 | 1/2020 | Maruno et al. |
| 2020/0166327 | A1 | 5/2020 | Hariyama et al. |

FOREIGN PATENT DOCUMENTS

| | | | |
|---|---|---|---|
| JP | 2003148909 | A | 5/2003 |
| JP | 2005224399 | A | 8/2005 |
| KR | 20110131975 | A | 12/2011 |

OTHER PUBLICATIONS

JPOA: Office Action issued Jul. 7, 2026 for corresponding Japanese Application No. 2025-535941.

EESR: Extended European Search Report issued Aug. 7, 2026 for corresponding EP 24 76 4623.

* cited by examiner

OPTICAL ACCELEROMETER SYSTEM

RELATED APPLICATIONS

This application claims priority from U.S. Patent Application Ser. No. 63/449,340, filed 2 Mar. 2023, which is incorporated herein in its entirety.

TECHNICAL FIELD

The present disclosure relates generally to sensor systems, and specifically to an optical accelerometer system.

BACKGROUND

Many types of instruments have been developed for measuring acceleration. One such example is a force-balanced accelerometer. For example, in a pendulous electrostatic force-balanced accelerometer, electrostatic forcing in a closed loop system is employed to position and obtain an output from a pendulous inertial mass or proof mass. The electrostatic forcing system may employ a capacitive pickoff electrode on each side of a pendulous member that has been etched from a silicon substrate. A control pulse can be employed to sequentially apply a constant amount of charge to each electrode. A variable force can be applied to the inertial mass by varying the amount of time (e.g., duty cycle) the charge is left on a respective plate. The amount of time the charge is left on a respective plate is based on the displacement of the inertial mass relative to a null position. However, electrostatic force-balanced accelerometers can be subject to a number of deleterious phenomena, such as accelerometer bias uncertainty which can be a major source of error in inertial measurement and/or navigation systems.

SUMMARY

One example includes an optical accelerometer system. The system includes an optical cavity system comprising a variable optical cavity that propagates a first optical beam and a fixed optical cavity that propagates a second optical beam. The fixed optical cavity can have a fixed cavity length and the variable optical cavity can have a cavity length that changes in response to an external acceleration. The optical cavity system can also include optics to provide a beat optical beam that is a combination of the first and second optical beams. The system also includes a detection system to monitor the beat optical beam to generate a beat voltage that is indicative of the frequency of the beat optical beam. The detection system can compare the beat voltage with a stable frequency reference voltage to determine a magnitude of the external acceleration.

Another example includes a method for measuring an external acceleration. The method includes generating a first optical beam and a second optical beam. The method also includes providing the first optical beam in a variable optical cavity having a cavity length that changes in response to the external acceleration, and providing the second optical beam in a fixed optical cavity having a fixed cavity length. The method also includes combining the first and second optical beams to generate a beat optical beam, and providing the beat optical beam to a photodetector to generate a beat voltage that is indicative of the frequency of the beat optical beam. The method further includes comparing the beat voltage with a stable frequency reference voltage to determine a magnitude of the external acceleration.

Another example includes an optical accelerometer system. The system includes an integrated optical cavity chip. The chip includes a variable optical cavity waveguide comprising a first gain medium, a first reflective Bragg grating, and a spring-mounted reflector configured to provide a variable cavity length for a first optical beam in response to an external acceleration. The chip also includes a fixed optical cavity waveguide comprising a second gain medium, a second reflective Bragg grating, and a reflector that is fixed to a housing of the integrated optical cavity chip to provide a fixed cavity length for a second optical beam. The chip also includes a waveguide combiner portion configured to optically combine the variable optical cavity waveguide and the fixed optical cavity waveguide to generate a beat optical beam that is a combination of the first and second optical beams. The chip further includes a photodetector configured to monitor the beat optical beam to generate a beat voltage that is indicative of the frequency of the beat optical beam. The system further includes a detection system configured to compare the beat voltage with a stable frequency reference voltage to determine a magnitude of the external acceleration.

DETAILED DESCRIPTION

Figure 1:
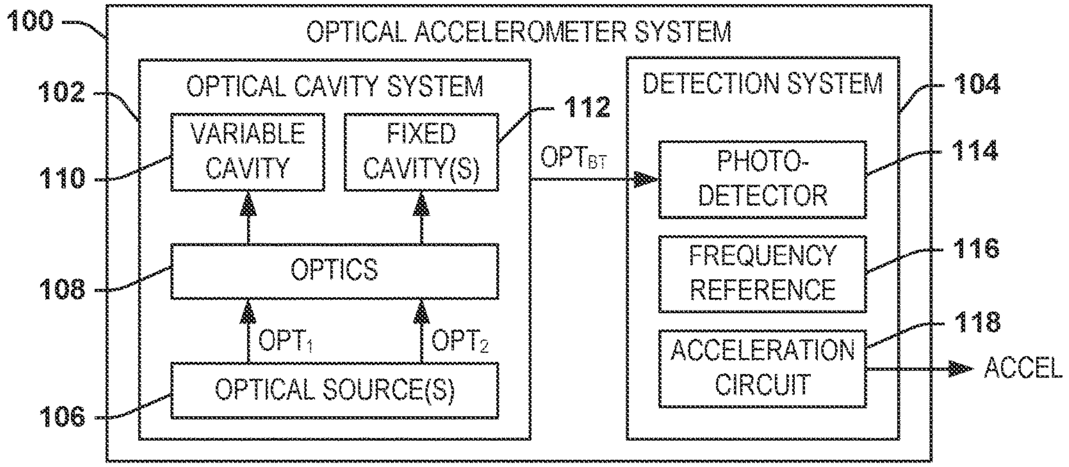
FIG. 1 illustrates an example of a block diagram of an optical accelerometer system.

The present disclosure relates generally to sensor systems, and specifically to an optical accelerometer system. The optical accelerometer system can be implemented in any of a variety of applications that may require accurate determination of an external acceleration acting upon a moving platform (e.g., an aerospace craft). As an example, the optical accelerometer system can be implemented in an inertial navigation system (INS) of a moving platform.

The optical accelerometer system can include an optical cavity system that includes a variable optical cavity and a fixed optical cavity. A first optical beam can propagate in the variable optical cavity having a variable cavity length, and a second optical beam can propagate in the fixed optical cavity having a fixed cavity length. As an example, the optical cavity system can include an optical source that is configured to generate the first and second optical beams. The optical source can correspond to at least one laser, such as a laser diode. For example, a single laser diode can generate a multimode optical beam that can be filtered to provide two optical modes corresponding to the first and second optical beams, respectively. As an example, the fixed optical cavity can include a reflecting surface that is mounted on a housing of the optical cavity system, and the variable optical cavity can include a spring-mounted reflective surface that is mounted to the housing of the optical cavity system. Therefore, the spring-mounted reflective surface can move in response to the external acceleration, thereby changing the frequency of the first optical beam relative to the frequency of the second optical beam.

As described herein, the term "spring-mounted" with reference to a reflective surface or reflector refers to any of a variety of ways to mount the reflective surface or reflector in a manner that allows the reflective surface or reflector to move relative to the housing of the optical cavity system based on a spring constant. The spring-mounted reflective surface is demonstrated herein as including spring mounts on opposite sides of the spring-mounted reflective surface. However, the spring-mounted reflective surface can include other spring-mounting arrangements, such as a spring cantilever or any of a variety of other spring-mounting techniques.

The optical cavity system can include optics configured to combine the first and second optical beams to generate a beat optical beam. The combination of the first and second optical beams to provide the beat optical beam can result in the beat optical beam having a frequency that is a difference of the frequencies first and second optical beams, and thus significantly less than the frequency of the first and second optical beams. For example, the beat frequency can have a frequency in the radio frequency (RF) spectrum (e.g., MHz to GHz). The beat optical beam can be provided to a photodetector, such that the frequency of the beat optical beam can be converted to a beat voltage signal. The beat voltage signal can be mixed with a stable frequency reference voltage generated by a frequency (e.g., a crystal oscillator) to generate a voltage difference signal. The voltage difference signal can be provided to an acceleration circuit that compares the voltage difference signal with a reference voltage to generate an output signal that corresponds to the magnitude of the external acceleration.

The optical accelerometer system can thus operate to determine the external acceleration with optical precision based on the use of optical beams, but with simple electronic components based on the conversion of the beat optical beam to a manageable RF frequency signal. As described in greater detail herein, the optical accelerometer system can also implement additional features for more accurate control, such as force-rebalance feedback, laser stabilization, and optical generation of the stable frequency reference voltage. Furthermore, the optical accelerometer system can be implemented in a very compact form-factor, as described in greater detail herein, which can also provide greater optical stability. Accordingly, the optical accelerometer system can be a significantly smaller and more efficient accelerometer than typical force-rebalance accelerometers or other typical optical accelerometers.

FIG. 1 illustrates an example of a block diagram of an optical accelerometer system 100. The optical accelerometer system 100 can be implemented to determine an external acceleration along a single axis. Thus, the optical accelerometer system 100 can be one of multiple optical accelerometer systems, such as three optical accelerometer systems in X, Y, and Z orthogonal axes, to provide a determination of the external acceleration acting upon the moving platform in three-dimensional space. As described herein, the term "external acceleration" describes an acceleration acting upon a moving platform that includes the optical accelerometer system 100, such as in response to motion (e.g., changes in velocity) of the moving platform or forces acting upon the moving platform.

The optical accelerometer system 100 includes an optical cavity system 102, and a detection system 104. In the example of FIG. 1, the optical cavity system 102 includes an optical source(s) 106 configured to generate a first optical beam $OPT_1$ and a second optical beam $OPT_2$. The optical source(s) 106 can correspond to one or more lasers that can generate a respective one or more optical beams having a precise frequency. As an example, the optical source(s) 106 can include a pair of lasers to generate the respective first and second optical beams OP1 and $OPT_2$, or can correspond to a single diode laser that is configured to generate a single optical beam from which the first and second optical beams $OPT_1$ and $OPT_2$ are generated.

The first and second optical beams $OPT_1$ and $OPT_2$ are provided to a set of optics 108 of the optical cavity system 102. As an example, the optics 108 can include collimating lenses and/or filters (e.g., an interference filter) to provide the first optical beam $OPT_1$ in a variable optical cavity 110, and to provide the second optical beam $OPT_2$ in a fixed optical cavity 112. As an example, the variable optical cavity 110 and the fixed optical cavity 112 can each be formed between a respective reflector and the optical source(s) 106, such as a lasing medium of a laser diode. As an example, the fixed optical cavity 112 can include a reflecting surface that is mounted on a housing of the optical cavity system 102, thereby exhibiting a fixed cavity length of the fixed optical cavity 112. However, as described herein, the variable optical cavity 110 has a variable cavity length that changes in response to the external acceleration. As an example, the variable optical cavity 110 can include a spring-mounted reflective surface that is mounted to the housing of the optical cavity system 102. Therefore, the spring-mounted reflective surface can move in response to the external acceleration, thereby changing the frequency of the first optical beam $OPT_1$ relative to the frequency of the second optical beam $OPT_2$.

As an example, the optics 108 can be configured to combine the first and second optical beams $OPT_1$ and $OPT_2$ to generate a beat optical beam $OPT_{BT}$. The combination of the first and second optical beams $OPT_1$ and $OPT_2$ to generate the beat optical beam $OPT_{BT}$ can result in the beat optical beam $OPT_{BT}$ having a frequency that is a difference of the frequencies of the first and second optical beams $OPT_1$ and $OPT_2$. Therefore, the frequency of the beat optical beam $OPT_{BT}$ can be significantly less than the frequency of the first and second optical beams $OPT_1$ and $OPT_2$, such as in the radio frequency (RF) spectrum (e.g., MHz to GHz). In the example of FIG. 1, the beat optical beam $OPT_{BT}$ is provided to a photodetector 114. The photodetector 114 can thus generate a beat voltage signal having a same frequency as the beat optical beam $OPT_{BT}$. As an example, the beat voltage signal can be mixed with a stable frequency reference voltage generated by a frequency reference 116 to generate a voltage difference signal. As an example, the frequency reference 116 can be a crystal oscillator, or can correspond to an optical means of generating a stable frequency reference voltage. The voltage difference signal can be provided to an acceleration circuit 118 that compares the voltage difference signal with a reference voltage to generate an output signal that corresponds to the magnitude of the external acceleration. In the example of FIG. 1, the output signal is demonstrated as a signal ACCEL, which can be indicative of the magnitude of the external acceleration.

Figure 2:
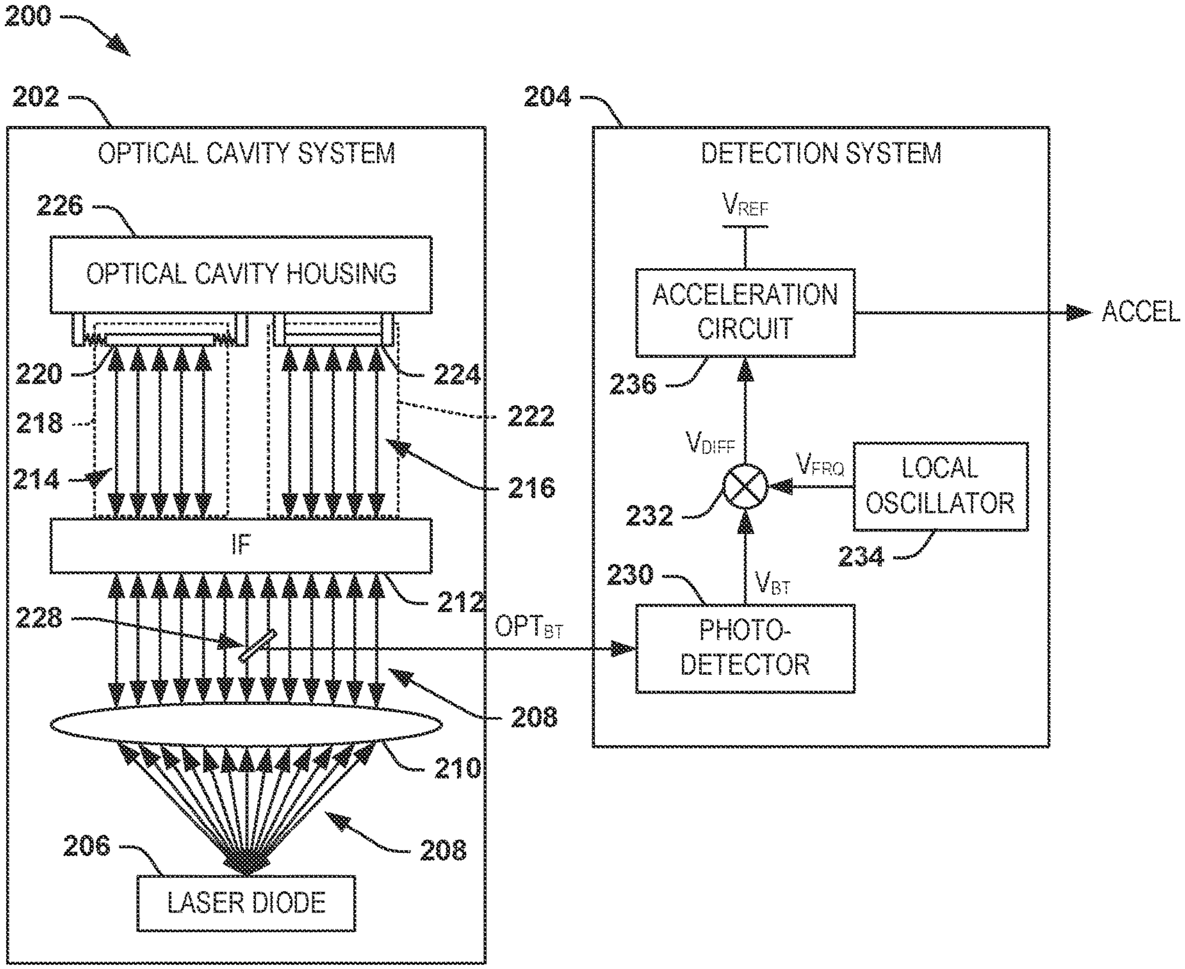
FIG. 2 illustrates an example of an optical accelerometer system.

FIG. 2 illustrates an example of an optical accelerometer system 200. The optical accelerometer system 200 can correspond to one example of the optical accelerometer system 100 in the example of FIG. 1. The optical accelerometer system 200 includes an optical cavity system 202, and a detection system 204. In the example of FIG. 2, the optical cavity system 202 includes a laser diode 206 configured to generate a multimode beam, demonstrated at 208.

The multimode beam 208 is provided to a collimating lens 210 to provide the collimated multimode beam 208 to an interference filter ("IF") 212. As an example, the interference filter 212 is configured to discriminate optical modes of the multimode beam 208, thereby providing separation of other modes from the multimode beam 208, such that a first optical beam 214 and a second optical beam 216 have a single optical mode. The example of FIG. 2 thus demonstrates generating the first and second optical beams 214 and 216 from a single laser diode 206. As another example, the optical cavity system 202 can include two laser diodes configured to generate the respective first and second optical beams 214 and 216. However, the use of a single laser diode 206 to generate the first and second optical beams 214 and 216 results in cancellation of uncorrelated common-mode noise between the first and second optical beams 214 and 216, such as could result from the use of two laser diodes.

The optical cavity system 202 includes a variable optical cavity 218 that is defined by a spring-mounted reflector 220 and the laser diode 206. The optical cavity system 202 also includes a fixed optical cavity 222 that is defined by a fixed reflector 224 and the laser diode 206. Both the spring-mounted reflector 220 and the fixed reflector 224 are coupled to an optical cavity housing 226. The example of FIG. 2 demonstrates the variable optical cavity 218 and the fixed optical cavity 222 as extending between the interference filter 212 and the optical cavity housing 226 for simplicity. However, each of the variable optical cavity 218 and the fixed optical cavity 222 can extend through the interference filter 212 to the laser diode 206.

The fixed reflector 224 therefore defines a fixed cavity length of the fixed optical cavity 222, such that the fixed optical cavity 222 can be substantially insensitive to mechanical shock and/or acceleration acting upon the optical accelerometer system 200. However, while the spring-mounted reflector 220 is coupled to the optical cavity housing 226, flexures on the spring-mounted reflector 220 define a variable cavity length of the variable optical cavity 218. Therefore, the spring constant of the flexures of the spring-mounted reflector 220 result in the variable optical cavity 218 having a cavity length that changes in response to a vector component of an external acceleration acting upon the optical accelerometer system 200, with the vector component being parallel with a propagation direction of the first and second optical beams 214 and 216.

In the example, the optical cavity system 202 includes a reflector (e.g., beam splitter) 228 arranged between the collimating lens 210 and the interference filter 212. The reflector 228 can thus reflect the multimode beam 208 to generate a beat optical beam $OPT_{BT}$ that is output from the optical cavity system 202. The beat optical beam $OPT_{BT}$ is thus a combination of the optical modes of the first and second optical beams 214 and 216, and therefore has a frequency that is a difference of the frequencies of the first and second optical beams 214 and 216. Therefore, the frequency of the beat optical beam $OPT_{BT}$ can be significantly less than the frequency of the first and second optical beams 214 and 216, such as in the radio frequency (RF) spectrum (e.g., MHz to GHz).

In the example of FIG. 2, the beat optical beam $OPT_{BT}$ is provided to the detection system 204. The detection system 204 includes a photodetector 230 that is configured to generate a beat voltage signal $V_{BT}$ having a same frequency as the beat optical beam $OPT_{BT}$. Because the beat frequency of the beat optical beam $OPT_{BT}$ is in the RF spectrum, the frequency of the first optical beam 214 can be determined by the photodetector 230 based on the difference between the variable frequency of the first optical beam 214 relative to the fixed frequency of the second optical beam 216, as indicated by the frequency of the beat optical beam $OPT_{BT}$, and thus the frequency of the beat voltage signal $V_{BT}$.

The beat voltage signal $V_{BT}$ is demonstrated as being provided to a mixer 232. The detection system 204 also includes a local oscillator 234 that is configured to generate a stable frequency reference voltage $V_{FRQ}$. The mixer 232 mixes the beat voltage signal $V_{BT}$ with the stable frequency reference voltage $V_{FRQ}$ to generate a voltage difference signal $V_{DIFF}$. The voltage difference signal $V_{DIFF}$ can have an amplitude that is proportional to the frequency difference between the beat voltage signal $V_{BT}$ and the stable reference frequency voltage $V_{FRQ}$.

The voltage difference signal $V_{DIFF}$ is provided to an acceleration circuit 236, along with a reference voltage $V_{REF}$. As an example, the reference voltage $V_{REF}$ can have an amplitude that corresponds to the constant frequency of the second optical beam 216. Therefore, the acceleration circuit 236 can compare the voltage difference signal $V_{DIFF}$ with the reference voltage $V_{REF}$ to determine an error magnitude that is proportional to the difference between the frequencies of the first and second optical beams 214 and 216. Therefore, the acceleration circuit 236 can be configured to provide the error as an output signal ACCEL, such that the output signal ACCEL can be indicative of a rebalance force that can be dependent on the spring constant of the flexures of the spring-mounted reflector 220. Therefore, the output signal ACCEL corresponds to the magnitude of the external acceleration in the vector direction parallel with the first and second optical beams 214 and 216.

As another example, the detection system 204 can be configured to convert the frequency of the beat voltage signal $V_{BT}$ to a DC voltage having an amplitude that is proportional to the frequency of the beat voltage signal $V_{BT}$. In this example, the mixer 232 and the local oscillator 234 can be omitted from the detection system 204. Therefore, the acceleration circuit 236 can compare the converted DC voltage directly with the reference voltage $V_{REF}$ to generate the output signal ACCEL. Similar to as described above, the output signal ACCEL can thus be indicative of the rebalance force, and thus the magnitude of the external acceleration.

Figure 3:
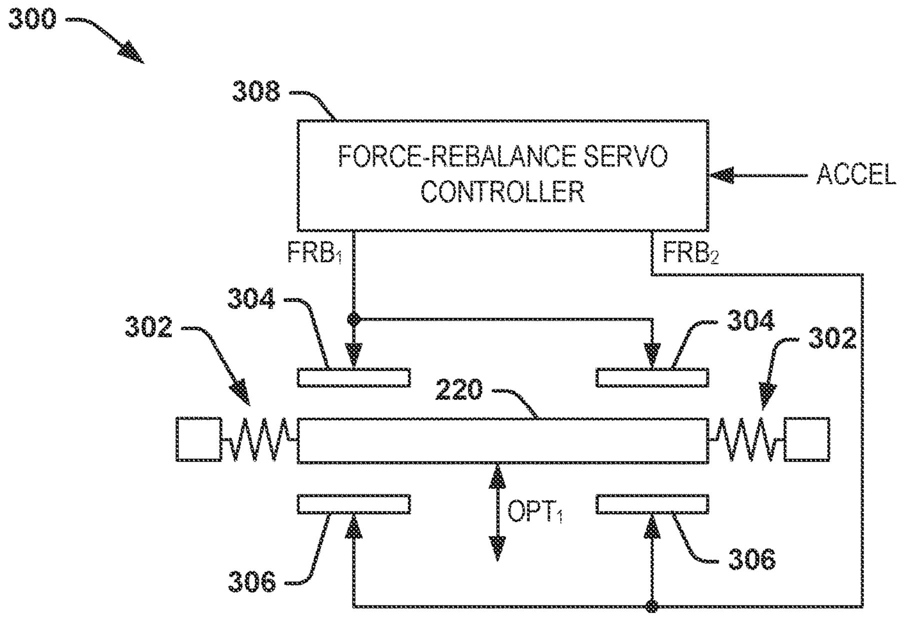
FIG. 3 illustrates an example of a force-rebalance system of an optical accelerometer system.

As described above, the optical accelerometer system 200 can include additional features to provide for a more stable and accurate measurement of the external acceleration acting upon the optical accelerometer system 200. FIG. 3 illustrates an example of a force-rebalance system 300 of the optical accelerometer system 200. The force-rebalance system 300 can be implemented in the optical cavity system 202 of the optical accelerometer system 200. The force-rebalance system 300 includes the spring-mounted reflector 220, with the optical cavity housing 226 not shown in the example of FIG. 3. The spring-mounted reflector 220 includes flexures 302 having a predetermined spring constant, and thus provide motion of the spring-mounted reflector 220 in response to the external acceleration to change the frequency of the first optical beam 214, demonstrated as "$OPT_1$" in the example of FIG. 3.

The force-rebalance system 300 also includes a first set of electrodes 304 that are positioned proximal with and above the spring-mounted reflector 220, and a second set of electrodes 306 that are positioned proximal with and below the spring-mounted reflector 220. The force-rebalance system 300 further includes a force-rebalance servo controller 308 that is configured to receive the output signal ACCEL. As described above, the output signal ACCEL can be indicative of a force associated with the external acceleration, and can thus correspond to a rebalance force that can counteract the external acceleration in an equal and opposite manner.

In the example of FIG. 3, the output signal ACCEL can be provided to the force-rebalance servo controller 308 in a feedback manner, such that the force-rebalance servo controller 308 can generate force rebalance signals $FRB_1$ and $FRB_2$ in response to the output signal ACCEL. The force rebalance signal $FRB_1$ is provided to the first set of electrodes 304 to provide a capacitive force to pull the spring-mounted reflector 220 to a null position after the external acceleration shortens the cavity length of the variable optical cavity 218. Similarly, the force rebalance signal $FRB_2$ is provided to the second set of electrodes 306 to provide a capacitive force to pull the spring-mounted reflector 220 to a null position after the external acceleration lengthens the cavity length of the variable optical cavity 218. Accordingly, the force-rebalance system 300 can operate to force-rebalance the spring-mounted reflector 220 to a null position, such as to mitigate oscillation of the spring-mounted reflector 220. Additionally, providing the force-rebalance feedback of the spring-mounted reflector 220 provides cooling of the center of mass motion of the spring-mounted reflector 220 that can be induced by Brownian motion of the surrounding gas (e.g., air).

Figure 4:
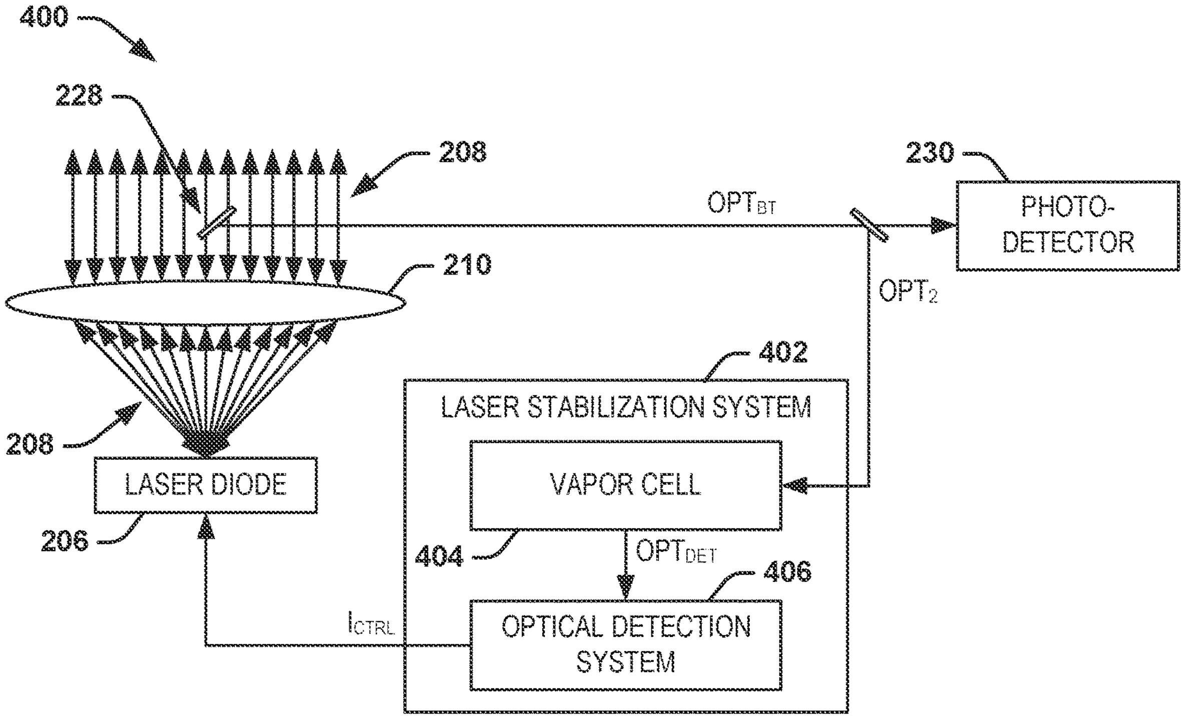
FIG. 4 illustrates an example of a diagram of a laser stabilization system of an optical accelerometer system.

FIG. 4 illustrates an example of a diagram 400 of a laser stabilization system 402 of the optical accelerometer system 200. The laser stabilization system 402 can be implemented in the detection system 204 of the optical accelerometer system 200. The diagram 400 includes a portion of the optical cavity system 202, including the laser diode 206, the multimode beam 208, the collimating lens 210, and the reflector 228 that provides the beat optical beam $OPT_{BT}$. The diagram 400 also includes the photodetector 230 of the detection system 204.

The laser stabilization system 402 includes a vapor cell 404 and an optical detection system 406. As an example, the vapor cell 404 can be filled with an alkali metal vapor (e.g., rubidium or cesium). In the example of FIG. 2, the second optical beam 216, demonstrated as "$OPT_2$" in the example of FIG. 4, a portion of the beat optical beam $OPT_{BT}$ is reflected to the laser stabilization system 402 via a reflector (e.g., partially-silvered mirror and/or optical filter) 408, and is provided through the vapor cell 404. While the example of FIG. 4 demonstrates that the second optical beam $OPT_2$ is provided from the beat optical beam $OPT_{BT}$, the second optical beam $OPT_2$ can instead be reflected from the multimode beam 208 emitted from the laser diode 206, similar to the reflector 228.

Photons of the second optical beam $OPT_2$ are thus absorbed by a population of the alkali metal vapor based on the frequency of the second optical beam $OPT_2$, such as based on any of a variety of Doppler-broadened absorption spectroscopy techniques. The amount of absorption of the photons of the beat optical beam $OPT_{BT}$ by the alkali metal vapor is measured by the optical detection system 406, such as based on monitoring the intensity of the second optical beam $OPT_2$ exiting the vapor cell 404. Therefore, the offset of the frequency of the second optical beam $OPT_2$ from a resonant frequency of the alkali metal vapor can be determined in a highly accurate manner, thereby providing an accurate determination of the frequency of the second optical beam $OPT_2$.

In the example of FIG. 4, the optical detection system 406 is configured to generate a control current $I_{CTRL}$ that is provided to the laser diode 206. The amplitude of the control current $I_{CTRL}$ can control the frequency of the multimode optical beam 208 generated by the laser diode 206, such as based on absorption of the alkali metal vapor relative to a maximum absorption at the resonant frequency of the alkali metal vapor. Therefore, the optical detection system 406 can control the amplitude of the control current $I_{CTRL}$ to lock the frequency of the multimode optical beam 208, and thus the frequency of the second optical beam 216 and the nominal frequency of the first optical beam 214, in a feedback manner. Accordingly, the laser stabilization system 402 can operate to provide stability in the frequency of the multimode optical beam 208 generated by the laser diode 206 to mitigate errors in the optical accelerometer system 200 resulting from frequency drift of the laser diode 206.

Figure 5:
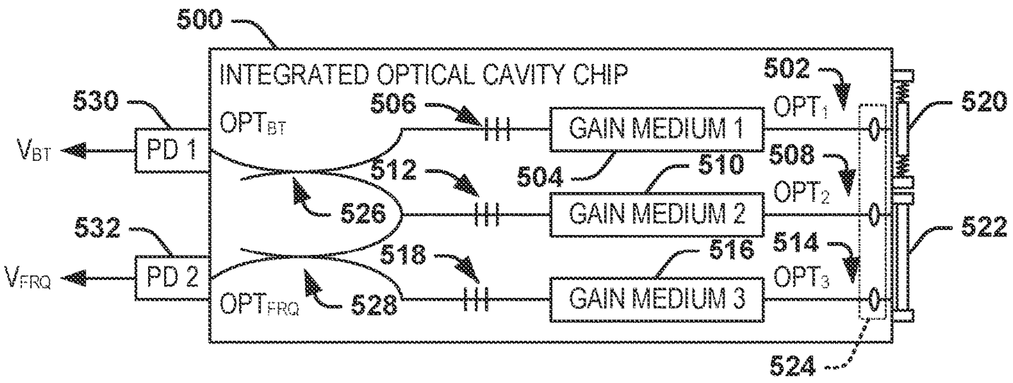
FIG. 5 illustrates an example of an integrated optical cavity chip of an optical accelerometer system.

FIG. 5 illustrates an example of an integrated optical cavity chip 500 of an optical accelerometer system. The integrated optical cavity chip 500 can be implemented in another example of the optical accelerometer system 100, such that the integrated optical cavity chip 500 can correspond to the optical cavity system 102. Therefore, reference is to be made to the example of FIG. 1 in the following description of the example of FIG. 5.

The integrated optical cavity chip 500 includes a variable optical cavity waveguide 502 that includes a first gain medium ("GAIN MEDIUM 1") 504 and a first reflective Bragg grating 506, a first fixed optical cavity waveguide 508 that includes a second gain medium ("GAIN MEDIUM 2") 510 and a second reflective Bragg grating 512, and a second fixed optical cavity waveguide 514 that includes a third gain medium ("GAIN MEDIUM 3") 516 and a third reflective Bragg grating 518. The gain media 504, 510, and 516 each correspond to a respective one of the optical sources 106 in the example of FIG. 1. Therefore, each of the gain media 504, 510, and 516 can be lased (e.g., via a current) to generate the first optical beam $OPT_1$, the second optical beam $OPT_2$, and a third optical beam $OPT_3$.

In the example of FIG. 5, the variable optical cavity waveguide 502 is defined by a spring-mounted reflector 520 and the first reflective Bragg grating 506, the first fixed optical cavity waveguide 508 is defined by a fixed reflector 522 and the second reflective Bragg grating 512, and the second fixed optical cavity waveguide 514 is defined by the fixed reflector 522 and the third reflective Bragg grating 518. Each of the optical cavity waveguides 502, 508, and 514 include a microlens 524 to focus the optical beam $OPT_1$ to the spring-mounted reflector 520 and the optical beams $OPT_2$ and $OPT_3$ to the fixed reflector 522. In the example of FIG. 5, the reflective Bragg gratings 506, 512, and 518 are arranged at different lengths relative to each other along the respective optical cavity waveguides 502, 508, and 514. Therefore, the first and second fixed optical cavity waveguides 508 and 514 have a fixed cavity length between the fixed reflector 522 and the respective reflective Bragg gratings 512 and 518, with the respective cavity lengths being different from each other. The variable optical cavity waveguide 502 has a variable cavity length between the spring-mounted reflector 520 and the reflective Bragg grating 506. Therefore, similar to as described above, the cavity length of the variable optical cavity waveguide 502 changes in response to a vector component of an external acceleration acting upon the integrated optical cavity chip 500, with the vector component being parallel with a propagation direction of the optical beams $OPT_1$, $OPT_2$, and $OPT_3$.

The integrated optical cavity chip 500 also includes a first waveguide combiner portion 526 and a second waveguide combiner portion 528. The waveguide combiner portions 526 and 528 and the microlenses 524 can collectively correspond to the optics 108 in the example of FIG. 1. The first waveguide combiner portion 526 is configured to optically combine the first and second optical beams $OPT_1$ and $OPT_2$ to generate the beat optical beam $OPT_{BT}$, similar to as described above regarding the reflector 228. The integrated optical cavity chip 500 includes a first photodetector 530 configured to monitor the beat optical beam $OPT_{BT}$, similar to the photodetector 230 in the example of FIG. 2, to generate the beat voltage signal $V_{BT}$. The associated detection system 104 can thus determine the magnitude of the external acceleration similar to as described above in the examples of FIGS. 1 and 2.

The second waveguide combiner portion 528 is configured to optically combine the second and third optical beams $OPT_2$ and $OPT_3$ to generate a reference frequency optical beam $OPT_{FRQ}$. Because of the difference in cavity lengths of the first and second fixed optical cavity waveguides 508 and 514, the reference frequency optical beam $OPT_{FRQ}$ can have a beat frequency, similar to the beat optical beam $OPT_{BT}$, that is a difference in the frequency of the second and third optical beams $OPT_2$ and $OPT_3$. Because of the cavity lengths of the first and second fixed optical cavity waveguides 508 and 514 are fixed, the frequencies of the second and third optical beams $OPT_2$ and $OPT_3$ can be very stable, even with frequency drift resulting from environmental considerations (e.g., temperature) based on the integration of the first and second fixed optical cavity waveguides 508 and 514 in the integrated optical cavity chip 500. Therefore, the beat frequency of the reference frequency optical beam $OPT_{FRQ}$ can likewise be very stable despite environmental considerations. The integrated optical cavity chip 500 also includes a second photodetector 532 configured to monitor the reference frequency optical beam $OPT_{FRQ}$ to generate the stable frequency reference voltage $V_{FRQ}$. The stable frequency reference voltage $V_{FRQ}$ can thus be provided to the detection system 104, such as to replace the local oscillator 234 that is configured to generate a stable frequency reference voltage $V_{FRQ}$ in the example of FIG. 2. By generating the stable frequency reference voltage $V_{FRQ}$ by optically combining the second and third optical beams $OPT_2$ and $OPT_3$ to generate the reference frequency optical beam $OPT_{FRQ}$ based on which the stable frequency reference voltage $V_{FRQ}$, the stable frequency reference voltage $V_{FRQ}$ can be more stable (e.g., can exhibit less drift) than the stable frequency reference voltage $V_{FRQ}$ generated from a local oscillator.

Figure 6:
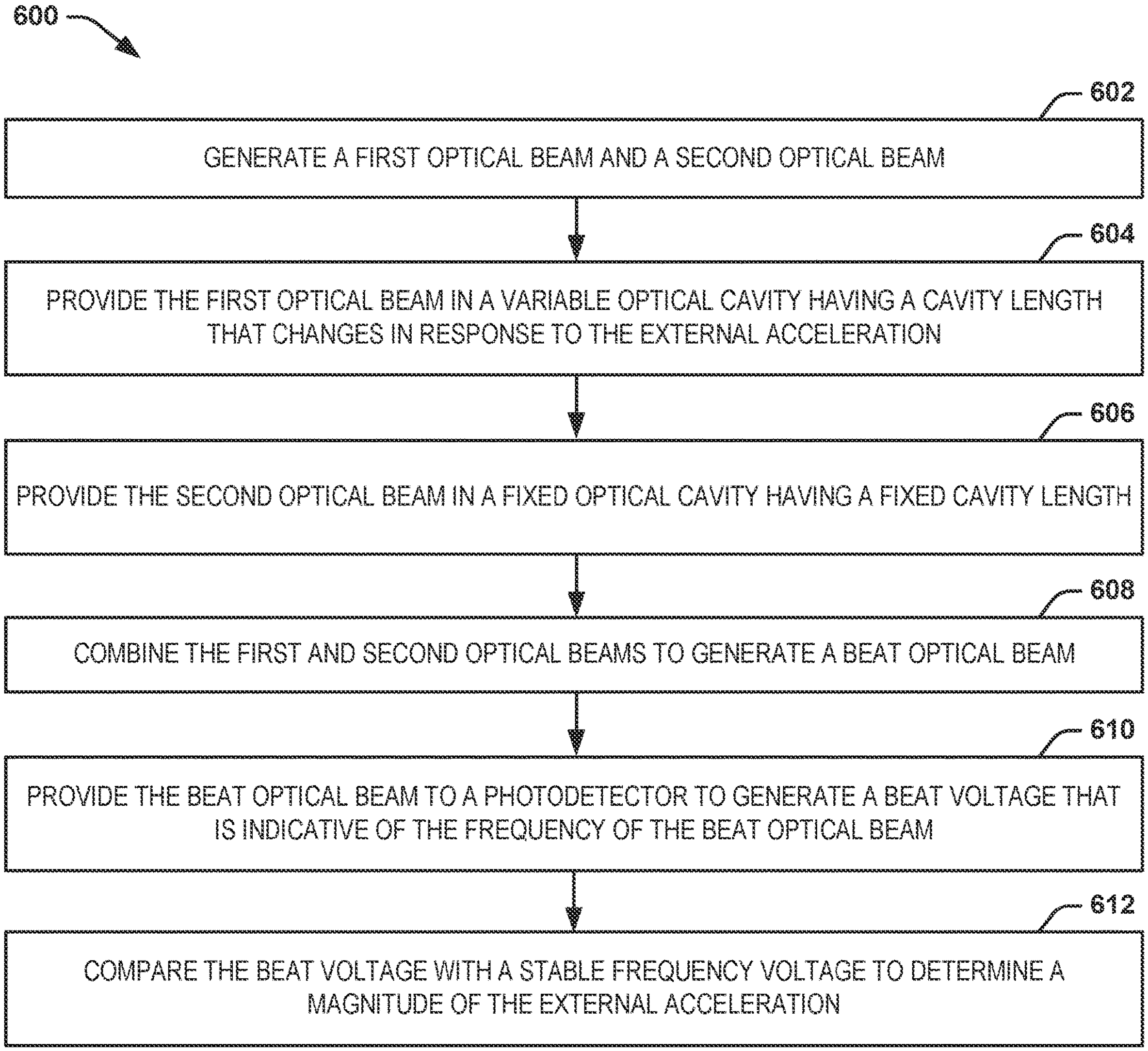
FIG. 6 illustrates an example of a method for measuring an external acceleration.

In view of the foregoing structural and functional features described above, methodologies in various aspects of the description will be better appreciated with reference to FIG. 6. The method of FIG. 6 is not limited by the illustrated order, as some aspects could, in the present description, occur in different orders and/or concurrently with other aspects from that shown and described herein. Moreover, not all illustrated features may be required to implement methodologies in an aspect of the present examples.

FIG. 6 illustrates an example of a method 600 for measuring an external acceleration. At 602, a first optical beam (e.g., the first optical beam $OPT_1$) and a second optical beam (e.g., the second optical beam $OPT_2$) are generated. At 604, the first optical beam is provided in a variable optical cavity (e.g., the variable optical cavity 110) having a cavity length that changes in response to the external acceleration. At 606, the second optical beam is provided in a fixed optical cavity (e.g., the fixed optical cavity 112) having a fixed cavity length. At 608, the first and second optical beams are combined to generate a beat optical beam (e.g., the beat optical beam $OPT_{BT}$). At 610, the beat optical beam is provided to a photodetector (e.g., the photodetector 114) to generate a beat voltage (e.g., the beat voltage $V_{BT}$) that is indicative of the frequency of the beat optical beam. At 612, the beat voltage is compared with a stable frequency reference voltage (e.g., the stable frequency reference voltage $V_{FRQ}$) to determine a magnitude of the external acceleration.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical accelerometer system comprising:

an optical cavity system comprising a variable optical cavity that propagates a first optical beam and a fixed optical cavity that propagates a second optical beam, the fixed optical cavity having a fixed cavity length and the variable optical cavity having a cavity length that changes in response to an external acceleration, the optical cavity system further comprising optics to provide a beat optical beam that is a combination of the first and second optical beams; and a detection system configured to monitor the beat optical beam to generate a beat voltage that is indicative of a frequency of the beat optical beam, the detection system being configured to compare the beat voltage with a stable frequency reference voltage to determine a magnitude of the external acceleration.

2. The system of claim 1, wherein the variable optical cavity comprises a spring-mounted reflector coupled to a fixed accelerometer housing, the spring-mounted reflector configured to receive the first optical beam and to flexibly respond to the external acceleration to change a length of the variable optical cavity, such that the first optical beam changes frequency in response to the external acceleration, thereby changing the frequency of the beat optical beam.

3. The system of claim 2, wherein the optical cavity system further comprises a force-rebalance servo controller configured to provide capacitive force-rebalance of the spring-mounted reflector based on the magnitude of the external acceleration provided as feedback to the optical cavity system.

4. The system of claim 1, wherein the optical cavity system comprises a laser diode configured to generate a multimode optical beam, wherein the optical cavity system comprises an interference filter configured to filter the multimode optical beam to generate the first and second optical beams.

5. The system of claim 4, further comprising an optical stabilization system comprising:

a vapor cell comprising an alkali metal vapor;

optics configured to provide the second optical beam through the vapor cell; and an optical detection system configured to determine absorption of photons of the alkali metal vapor by the second optical beam to determine a frequency of the second optical beam, and to generate a feedback current that is provided to the laser diode to stabilize a frequency of the multimode optical beam.

6. The system of claim 1, wherein the detection system comprises:

a local oscillator configured to generate the stable frequency reference voltage; and a mixer configured to mix the beat voltage and the stable frequency reference voltage to generate a difference voltage that is indicative of a difference between a frequency of the beat voltage and a frequency of the stable frequency reference voltage.

7. The system of claim 6, wherein the detection system further comprises an acceleration circuit configured to compare the difference voltage with a reference voltage to generate an output signal corresponding to the external acceleration.

8. The system of claim 7, wherein the optical cavity system further comprises a force-rebalance servo controller configured to provide capacitive force-rebalance of the variable optical cavity based on the output signal.

9. The system of claim 1, wherein the optical cavity system is arranged on an integrated optical cavity chip, wherein the variable optical cavity is arranged as a variable optical cavity waveguide comprising a first gain medium and a first reflective Bragg grating, wherein the fixed optical cavity is arranged as a fixed optical cavity waveguide comprising a second gain medium and a second reflective Bragg grating, wherein the optics are configured as a waveguide combiner portion configured to optically combine the variable optical cavity waveguide and the fixed optical cavity waveguide to generate the beat optical beam.

10. The system of claim 9, wherein the waveguide combiner portion is a first waveguide combiner portion, the integrated optical cavity chip further comprises:

a reference optical cavity waveguide having a fixed cavity length and comprising a third gain medium and a third reflective Bragg grating;

a second waveguide combiner portion configured to optically combine the fixed optical cavity waveguide and the reference optical cavity waveguide to generate a reference beat optical beam;

a first photodetector configured to generate the beat voltage based on the beat optical beam; and a second photodetector configured to generate the stable frequency reference voltage based on the reference beat optical beam.

11. A method for measuring an external acceleration, the method comprising:

generating a first optical beam and a second optical beam;

providing the first optical beam in a variable optical cavity having a cavity length that changes in response to the external acceleration;

providing the second optical beam in a fixed optical cavity having a fixed cavity length;

combining the first and second optical beams to generate a beat optical beam;

providing the beat optical beam to a photodetector to generate a beat voltage that is indicative of a frequency of the beat optical beam; and comparing the beat voltage with a stable frequency reference voltage to determine a magnitude of the external acceleration.

12. The method of claim 11, wherein the variable optical cavity comprises a spring-mounted reflector configured to receive the first optical beam and to flexibly respond to the external acceleration to change a length of the variable optical cavity, the method further comprising providing capacitive force-rebalance feedback of the spring-mounted reflector based on the magnitude of the external acceleration.

13. The method of claim 11, wherein generating the first and second optical beams comprises:

providing a multimode optical beam via a laser diode; and providing the multimode optical beam through an interference filter to generate the first and second optical beams.

14. The method of claim 12, further comprising:

providing at least one of the first and second optical beams through a vapor cell comprising an alkali metal vapor;

determining absorption of photons of the alkali metal vapor by the second optical beam to determine a frequency of the second optical beam; and providing a feedback current to stabilize a frequency of the first and second optical beams.

15. The method of claim 11, wherein generating the first optical beam comprises generating the first optical beam in a variable optical cavity waveguide comprising a first gain medium and a first reflective Bragg grating, wherein generating the second optical beam comprises generating the second optical beam in a fixed optical cavity waveguide comprising a second gain medium and a second reflective Bragg grating, wherein combining the first and second optical beams comprises optically combining the variable optical cavity waveguide and the fixed optical cavity waveguide to generate the beat optical beam.

16. The method of claim 15, wherein providing the beat optical beam to the photodetector comprises providing the beat optical beam to a first photodetector, the method further comprising:

generating a third optical beam in a reference optical cavity waveguide having a fixed cavity length and comprising a third gain medium and a third reflective Bragg grating;

optically combining the fixed optical cavity waveguide and the reference optical cavity waveguide to generate a reference beat optical beam; and providing the reference beat optical beam to a second photodetector to generate the stable frequency reference voltage.

17. An optical accelerometer system comprising:

an integrated optical cavity chip comprising:

- a variable optical cavity waveguide comprising a first gain medium, a first reflective Bragg grating, and a spring-mounted reflector configured to provide a variable cavity length for a first optical beam in response to an external acceleration;
- a fixed optical cavity waveguide comprising a second gain medium, a second reflective Bragg grating, and a reflector that is fixed to a housing of the integrated optical cavity chip to provide a fixed cavity length for a second optical beam;
- a waveguide combiner portion configured to optically combine the variable optical cavity waveguide and the fixed optical cavity waveguide to generate a beat optical beam that is a combination of the first and second optical beams; and
- a photodetector configured to monitor the beat optical beam to generate a beat voltage that is indicative of a frequency of the beat optical beam; and a detection system configured to compare the beat voltage with a stable frequency reference voltage to determine a magnitude of the external acceleration.

18. The system of claim 17, wherein the waveguide combiner portion is a first waveguide combiner portion, wherein the photodetector is a first photodetector, wherein the reflector is a first reflector wherein the integrated optical cavity chip further comprises:

a reference optical cavity waveguide comprising a third gain medium, a third reflective Bragg grating, and a second reflector that is fixed to the housing of the integrated optical cavity chip to provide a fixed cavity length of the reference optical cavity waveguide;

a second waveguide combiner portion configured to optically combine the fixed optical cavity waveguide and the reference optical cavity waveguide to generate a reference beat optical beam; and a second photodetector configured to generate the stable frequency reference voltage based on the reference beat optical beam.

19. The system of claim 17, wherein the detection system further comprises:

a mixer configured to mix the beat voltage and the stable frequency reference voltage to generate a difference voltage that is indicative of a difference between a frequency of the beat voltage and a frequency of the stable frequency reference voltage; and an acceleration circuit configured to compare the difference voltage with a reference voltage to generate an output signal corresponding to the external acceleration.

20. The system of claim 18, wherein the integrated optical cavity chip further comprises a force-rebalance servo controller configured to provide capacitive force-rebalance of the variable optical cavity waveguide based on an output signal.

* * * * *